J. STURGIS.
Two-Horse Eveners.
No. 134,946. Patented Jan. 14, 1873.
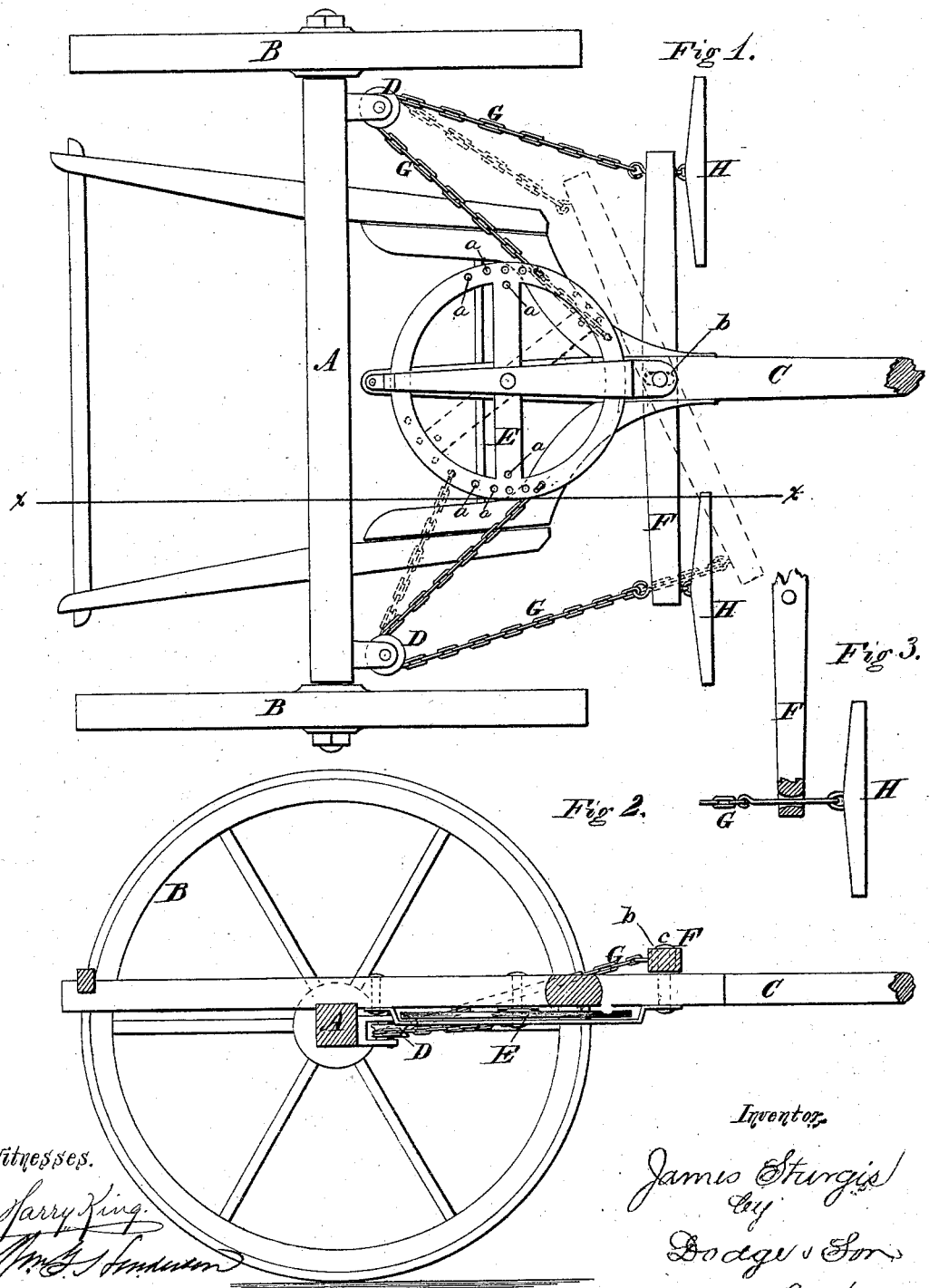

UNITED STATES PATENT OFFICE.

JAMES STURGIS, OF MINNEAPOLIS, MINNESOTA.

IMPROVEMENT IN TWO-HORSE EVENERS.

Specification forming part of Letters Patent No. 134,946, dated January 14, 1873.

*To all whom it may concern:*

Be it known that I, JAMES STURGIS, of Minneapolis, in the county of Hennepin and State of Minnesota, have invented certain Improvements in Two-Horse Eveners, of which the following is a specification, reference being had to the accompanying drawing.

My invention consists in a novel manner of constructing two-horse eveners, as hereinafter explained, whereby they are rendered extremely cheap and efficient and caused to support the whiffletrees in place.

Figure 1 is an under view of the forward truck of a wagon having my evener applied. Fig. 2 is a longitudinal section of the same on the line $x\ x$, and Fig. 3 a view of a modification.

A is the forward axle of the wagon, B B the wheels, and C the tongue, all of which parts are constructed and arranged in the ordinary manner. In applying my evening devices, I first secure to the front side of the axle, near its ends, two pulleys, D, as shown in Fig. 1. I then pivot to the under side of the tongue C a circular plate or wheel, E, provided in its opposite sides with holes $a$, as shown. I next pivot to the top of the tongue, a little forward of the disk or wheel E, a vibrating bar or double-tree, F, which is provided with a cross-slot, $b$, to receive the pivot $c$, as shown, so that it has a slight freedom of movement forward and backward on the tongue. From the ends of the bar or double-tree F I pass two chains, G, backward around the pulleys D, and then connect their ends to opposite sides of the wheel E, as shown in Fig. 1. The chains extend outward at an angle of about forty-five degrees, and their ends are connected to the wheel at such points that they draw from a point forward of the center, as shown, so that the tendency of each chain, when strained, is to draw the wheel around until its end is in line with the center thereof. The two chains of course tend to turn the wheel in opposite directions. To the ends of the bar or double-tree F I attach the whiffletrees H, as shown in Fig. 1.

It will be seen that, as the double-tree is free to move forward and back on its pivot, the strain from the whiffletrees is not received thereon, but upon the chains and wheel. The bar or double-tree is used for the purpose of supporting the whiffletrees and of holding them in position, so that they cannot swing sidewise, as they would otherwise do. As long as the two horses pull evenly the bar or double-tree retains its normal position and the chains draw on the wheel at the same angles, as shown in Fig. 1, so that the work is evenly divided between the horses. When, however, either horse falls back the bar or double-tree is allowed to move and the chains to move and turn the plate or wheel. As the plate or wheel turns the chain of the forward horse has its rear end carried around nearer in line with the center, so that it has less leverage, while the chain of the rear horse has its end carried further out of line, so that it has an increased leverage, as shown by the dotted lines in Fig. 1. Thus, it will be seen, the horse which falls behind is given an increased leverage, while the leading horse has his leverage decreased in order that his companion may regain his proper position. The difference in leverage varies just in proportion to the relative positions of the horses. The ends of the chains are provided with hooks, and are connected to the plate or wheel by inserting the hooks into the holes $a$ therein, as shown. A series of the holes is made in each side of the plate or wheel at various points and at different distances from the center, so as to permit the chains to be adjusted, as may be required. By attaching the end of one nearer the center than the end of the other the labor may be divided unequally between the horses, as their difference in strength may require.

Instead of allowing the double-tree to move forward and backward, in order to relieve its pivot and throw the entire strain on the chains, the same end may be attained by passing the ends of the chains loosely through the double-tree and attaching the whiffletree to their ends, or by mounting sliding rods in the ends of the double-tree and connecting the chains to one end and the whiffletree to the other end thereof, as shown in Fig. 3.

Having described my invention, what I claim is—

The combination of the pivoted plate E, pulleys D, chains G, double-tree F, and whiffletrees H, when arranged to operate substantially as described.

JAMES STURGIS.

Witnesses:
 ANDREW ERNST,
 CHARLES F. PILLSBURY.